United States Patent [19]

Cave

[11] Patent Number: 5,822,404

[45] Date of Patent: Oct. 13, 1998

[54] SYSTEM AND METHOD FOR IDENTIFYING REMOTE COMMUNICATIONS FORMATS

[75] Inventor: Ellis K. Cave, Garland, Tex.

[73] Assignee: InterVoice Limited Partnership, Reno, Nev.

[21] Appl. No.: 720,559

[22] Filed: Sep. 30, 1996

[51] Int. Cl.[6] .......................... H04M 1/64; H04M 11/00
[52] U.S. Cl. ................. 379/67; 370/468; 379/69; 379/93.08; 379/93.29; 379/93.34; 379/100.15; 379/351
[58] Field of Search .................. 379/93.34, 93.29, 379/93.31, 100.15, 93.08, 69, 92.03, 351; 370/468

[56] References Cited

U.S. PATENT DOCUMENTS

| | | | |
|---|---|---|---|
| 4,837,797 | 6/1989 | Freeny, Jr. | 379/67 X |
| 4,931,250 | 6/1990 | Greszczuk | 375/222 |
| 4,991,169 | 2/1991 | Davis et al. | 370/463 |
| 5,048,076 | 9/1991 | Maurer et al. | 379/102.02 X |
| 5,202,899 | 4/1993 | Walsh | 375/222 |
| 5,313,467 | 5/1994 | Varghese et al. | 370/468 |
| 5,404,400 | 4/1995 | Hamilton | 379/386 |
| 5,483,580 | 1/1996 | Brandman et al. | 379/88 |
| 5,490,210 | 2/1996 | Sasso | 379/93.09 X |
| 5,493,609 | 2/1996 | Winseck, Jr. et al. | 379/93.08 |
| 5,497,373 | 3/1996 | Hulen et al. | 379/89 X |
| 5,515,373 | 5/1996 | Lynch et al. | 370/468 X |
| 5,555,244 | 9/1996 | Gupta et al. | 370/468 X |
| 5,577,105 | 11/1996 | Baum et al. | 379/93.34 X |
| 5,606,599 | 2/1997 | O'Mahony et al. | 379/88 X |
| 5,671,269 | 9/1997 | Egam et al. | 379/88 |
| 5,675,639 | 10/1997 | Itani | 379/351 |
| 5,687,174 | 11/1997 | Edem et al. | 370/446 |

*Primary Examiner*—Harry S. Hong
*Attorney, Agent, or Firm*—Fulbright & Jaworski L.L.P.

[57] ABSTRACT

In a telecommunications system 10 in which remote terminals 20A through 20G are exchanging information with Interactive Information Response Unit (IIRU) 30 via communications in diverse formats and/or media, a system and method for identifying said formats and/or media so that responsive to said identification, appropriate resources 33 may be allocated to the communications to enable IIRU 30 and remote terminals 20A through 20G to exchange information intelligibly.

29 Claims, 3 Drawing Sheets

SYSTEM AND METHOD FOR IDENTIFYING REMOTE COMMUNICATIONS FORMATS

RELATED PATENTS AND APPLICATIONS

Reference is hereby made to commonly assigned U.S. Pat. No. 4,959,854, APPARATUS AND METHOD FOR AUTOMATICALLY RECONFIGURING TELEPHONE NETWORK RESOURCES, the disclosure of which is incorporated herein by reference.

TECHNICAL FIELD OF THE INVENTION

This invention relates to communications systems, and more particularly to a system and method for identifying the format and/or medium of an incoming communication so that system resources may be allocated to facilitate exchange of information during the communication in a compatible format and/or medium.

BACKGROUND OF THE INVENTION

In cases where a remote user desires to exchange information with a centralized local telecommunications system, it is known in the art for the system to allocate centralized resources responsive to the format of the communication from the user. These resources then format the information to be exchanged to be compatible with the user's communication format.

For example, a simple switch may allow remote telephone users to be placed in communication with one of several centralized resources, each resource compatible with the user's telephone, according to the needs or purpose of the user's communication. Such centralized resources might include a live telephone operator, or DTMF receiver/transmitter, or a voice player, or a text-to-speech player, and so on. Alternatively, the user might be communicating by fax, in which case a fax modem would need to be switched in. Alternatively again, the user might be communicating by computer, in which case it would be necessary to switch in a data modem, or perhaps an ISDN interface.

Commonly-assigned U.S. Pat. No. 4,959,854 teaches allocating such centralized resources in an alternative to simple switching. In this patent, different resources are configurable by software to be compatible with the various formats or media of remote telephone users' communications. Centralized resources are thus optimized because, to a large extent, the resources may be tailored by software to meet the needs and volume of user traffic at a particular time.

Whether allocation is to be by switch or by software, however, there is still a need to analyze the user's incoming communication to determine the appropriate centralized resources to allocate. Certainly, the user's particular terminal device is not always apparent from the type of port that the user's communication comes in on. Therefore, the centralized system needs an answer to the question: "Among all these centralized resources I have at my disposal to allocate to your incoming communication, which one(s) do you want?" For example, a bank might allow customers to dial in and inquire of account balances either by speech player response to DTMF, or by personal computer using communications software. Often in the current art, the bank may have two separate dial-in telephone lines assigned, one for speech/DTMF, the other for computer data modem. Alternatively, intervention by a live operator may become necessary to allocate the correct resources.

It would therefore be advantageous for the bank's system to be able to automatically recognize a particular customer's communication medium and format at the time that the customer's communication starts, so that the system may allocate the appropriate resource to be responsive to the customer's communication. The present invention addresses this need.

SUMMARY OF THE INVENTION

As noted above, it is common for telecommunications systems users to want to communicate remotely with centralized information systems that dispense and receive information. Such systems are known to facilitate this information exchange by allocating centralized resources that make the information compatible with the format and/or medium in which the remote user is communicating. For purposes herein, such systems will be referred to as Interactive Information Response Units, or IIRUs.

A preferred embodiment of the present invention includes a system that, upon connection to a user, performs a series of inquiry and deduction steps designed to identify the user's terminal device so that the IIRU may allocate the correct centralized resources to enable information exchange with the user. It will be understood that this identification is typically a two-stage analysis: (1) to determine the type of terminal device being used by the user; and (2) if the terminal device is a type that can support multiple media (such as high-speed computer), the particular media capable of being supported in this communication.

Continuing the bank balance inquiry example from the previous section, suppose the user is communicating with a traditional DTMF handset telephone with a twisted pair hookup to a POTS line linking the two parties. Upon connection with the user, the IIRU plays an audible message such as: "For balance inquiries, please press 1." Upon detecting a DTMF tone for the numeral 1, the present invention deduces that the IIRU is communicating with a human operating a traditional DTMF telephone terminal. The IIRU then allocates centralized resources in which bank balance information is communicated in audible speech format, responsive to DTMF signals from the user.

On the other hand, if in response to the request for the provision of a "1", the system hears a data modem tone, or fax modem tone, the present invention then deduces that the user is communicating by a computer or a ax machine, and that further inquiries and processing will be necessary to identify the correct centralized resource to allocate to enable communication with the user. This process of inquiry and deduction continues until the present invention has identified the format and/or medium in which the user is communicating, so that the IIRU may allocate the correct centralized resource(s) to enable information exchange.

It will therefore be appreciated that a technical advantage of the present invention is to identify the format of an incoming user's communication so that an associated IIRU can allocate the correct resources to enable information exchange with the user.

A further technical advantage of the present invention is that telecommunications lines and live operator resources may be optimized by being able to recognize and incoming communication's format and/or medium automatically, so that the correct resource(s) may be allocated to facilitate information exchange.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
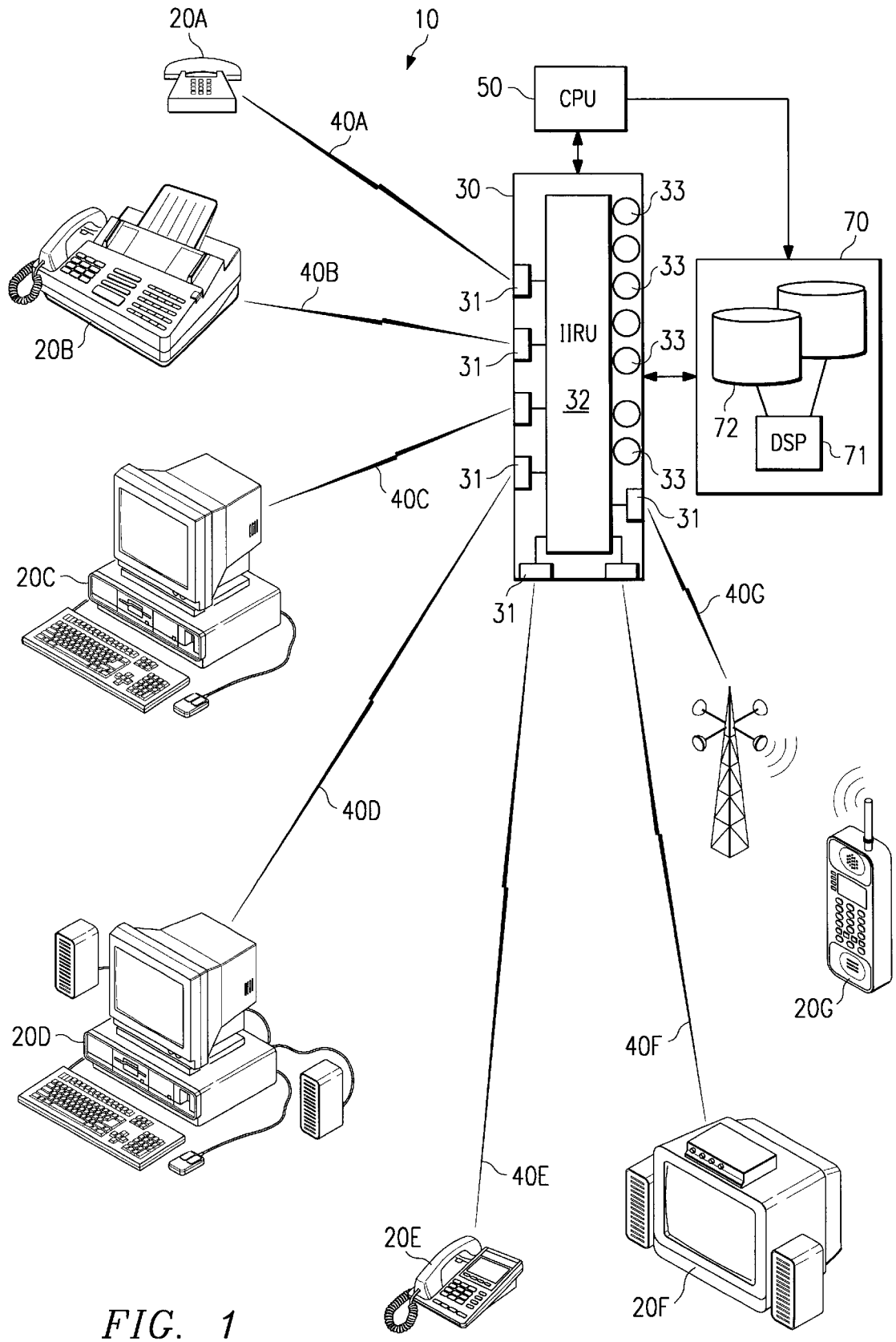
FIG. 1 is a diagram illustrating exemplary architecture enabled by the present invention.

Turning first to FIG. 1, it will be seen that system 10 comprises a plurality of terminal devices 20A through 20G connected to IIRU 30 via a plurality of interconnecting links 40A through 40G. It will be appreciated that the present invention is not limited to specific types of terminal devices, but that terminal devices 20A through 20G are shown for illustrative purposes. These illustrated exemplary terminal devices are: conventional telephone (20A), fax machine (20B), standard desktop computer (20C), multimedia desktop computer (20D), enhanced telephone with display (20E), home entertainment center (20F), and cellular/wireless telephone (20G). Other terminal devices not illustrated may include a personal communications system (PCS), a hearing impaired terminal, or a pager.

Similarly, it will be understood that interconnecting links 40A through 40G may be one of several types of link of varying speed and bandwidth, and may be independent of the type of terminal device to which they connect. It will be further understood that the present invention is not limited to specific types of interconnecting link. Examples of the types of interconnecting links contemplated by the present invention are POTS lines, ISDN lines, T1 lines, fiber optic lines, and, as illustrated in item 40G, a partial wireless link. Modems, data compression resources and other data conversion devices operating in terminal devices 20A through 20G, where applicable, may also affect the speed and bandwidth of a particular interconnecting link.

The information to be exchanged with terminal devices 20A through 20G is advantageously stored in generic form on information resource 70, which in turn is in data communication with IIRU 30. IIRU 30 comprises ports 31 through which terminal devices 20A through 20G connect to IIRU 30. Switch 32 within IIRU 30 enables resources 33 to be allocated to terminal devices through ports 31 according to terminal device format/medium identifications made by the present invention. It will be understood that, in some cases, ports 31 are individualized to receive communication from only a specific type of terminal device, in which cases the terminal device type can be inferred from the particular ports 31 to which the terminal device is connected. In most cases, however, ports 31 are a generic telephony port and so the terminal device type cannot be inferred from the port type. In such cases, the present invention will identify the terminal device type.

Once the appropriate resources 33 have been allocated, said resources 33 then adapt generic information available from information resource 70 into formats compatible with pending communications, so that terminal devices 20A through 20G may exchange information with information resource 70. CPU 50 controls the interactive operation of IIRU 30 and information resource 70. It will be understood that consistent with the present invention, information resource 70 may be physically located in or near to the IIRU 30. Alternatively, information resource 70 may also be physically located distant from IIRU 30 and coupled thereto, for example, by a local or wide area network.

It will be further understood with reference to FIG. 1 that information resource 70 need not be a simple mass storage device. In most cases, information resource 70 will also include processor 71 that stores and processes information held on storage device 72 in combination with other intelligent functionality. Alternatively, information resource 70 may be a database server.

CPU 50 further advantageously enables the present invention in identifying the formats and/or media of pending communications so that the correct resources 33 may be allocated to facilitate information exchange between information resource 70 and terminal devices 20A through 20G. It will nonetheless be appreciated by those in this art that the logic of the present invention may be embodied on software executable on any general purpose computer with a processing unit, a memory, and advantageously one or more display devices. Accordingly, in other embodiments hereof, the present invention need not necessarily reside at CPU 50, so long as the allocation of resources 33 remains disposed to be responsive to remote the format of communications as determined by the present invention.

Figure 2A:
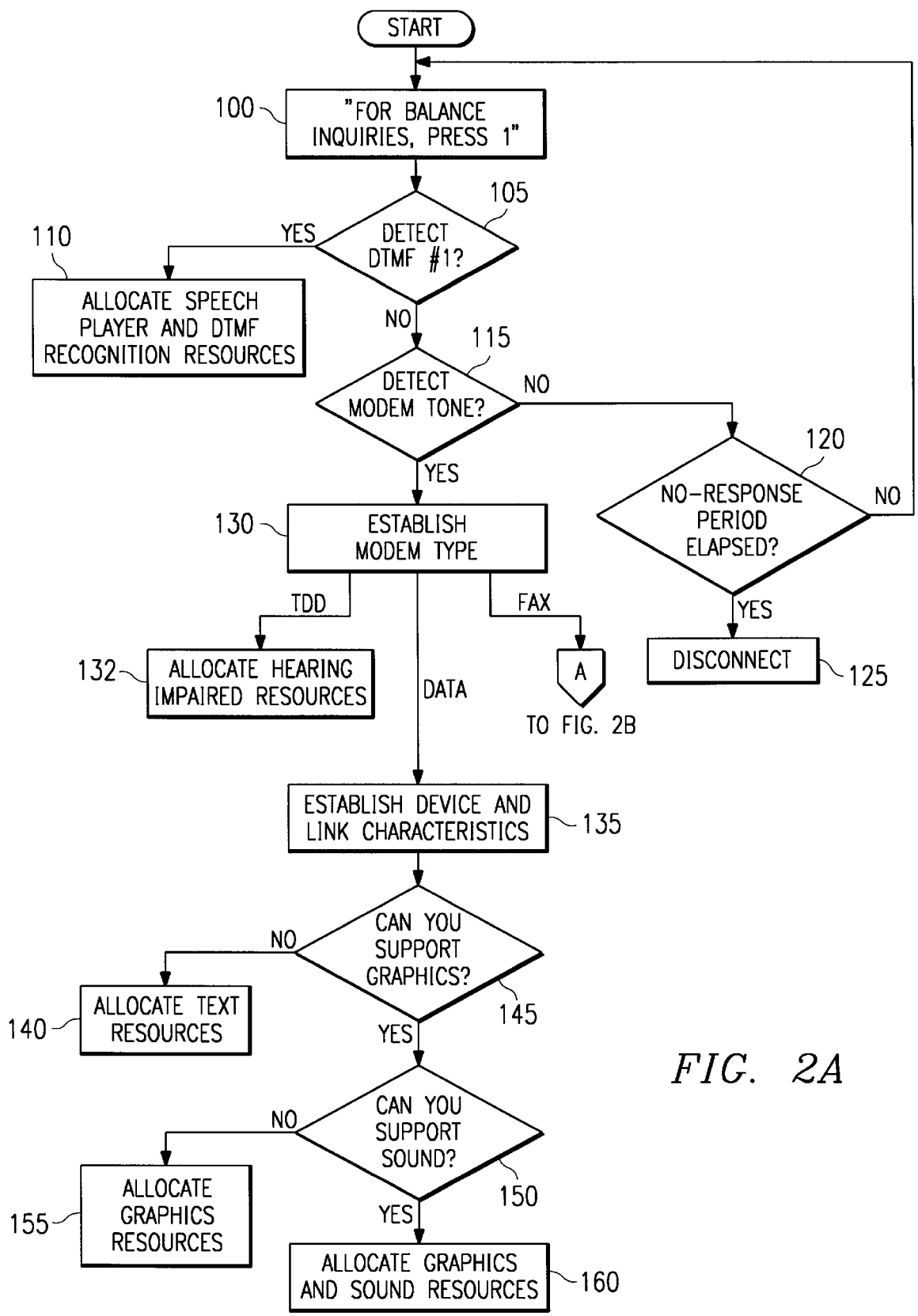
FIG. 2A is a flow diagram illustrating a first part of the logic flow of a preferred embodiment of the present invention.
Figure 2B:
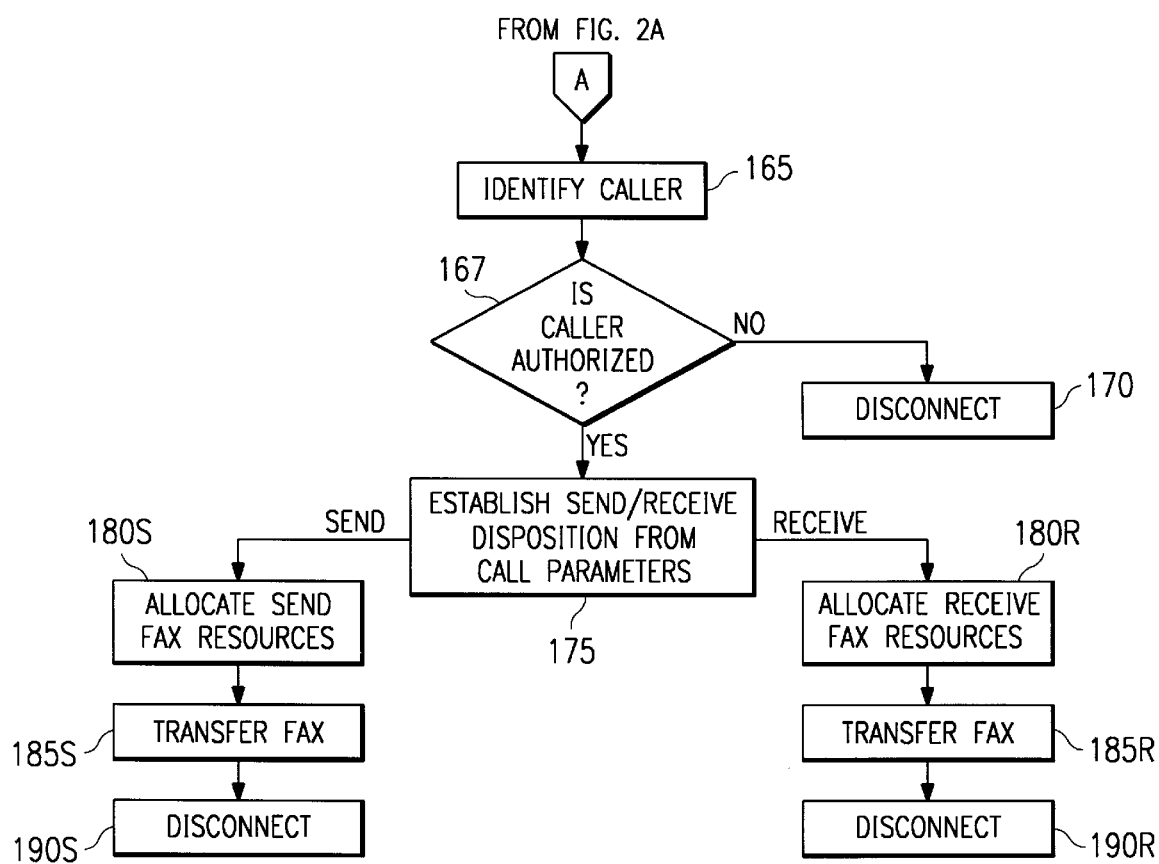
FIG. 2B is a flow diagram illustrating a second part of the logic flow of a preferred embodiment of the present invention.

FIGS. 2A and 2B comprise a flow diagram illustrating exemplary logic followed by the present invention in a presently preferred embodiment. The logic is directed to allowing users of remote terminal devices such as illustrated in FIG. 1 to access information at a financial institution, and in particular to inquire of a bank balance (hereafter "the system"). It will be understood by those in this art, however, that this is but one of many applications of the present invention in identifying communications formats.

In FIG. 2A, upon connection to the system, the logic begins with an automated voice message such as "for balance inquiries, press 1" (block 100). If the system detects a DTMF tone in response equivalent to the numeral 1 (block 105), then the system deduces that it is in telephone communication with a human whose communication formats are likely to be DTMF in response to speech player. Appropriate resources are allocated (block 110).

If at block 105, however, the system does not detect a DTMF numeral 1, then the system next looks for a modem tone (block 115). If no modem tone is detected, then the system returns to block 100 and prompts again for DTMF numeral 1. Eventually, after a predetermined period in which the system has detected either no DTMF tone or no modem tone, the system disconnects (blocks 120 and 125).

Returning to block 115, and with further reference to FIG. 2A, if the system does detect a modem tone, it first establishes the type of modem with which it is connecting (block 130). If it is connecting with a fax modem, then processing continues as will be described later.

Alternatively, if the system establishes in block 130 that it is connecting with a TDD modem, the system allocates resources appropriate to communicate information with a hearing-impaired device (block 132).

Alternatively again, if the system establishes in block 130 that it is connecting with a data modem, the system next establishes characteristics of the remote terminal device and of interconnecting link between the modem and the system (block 135). These characteristics include the speed and bandwidth capabilities of the connection and the processing capability of the remote terminal device.

It will be appreciated that the potential bandwidth of the interconnecting link may also be enhanced by data compression resources. Although not shown on FIG. 2B, those in this art will understand that once a link between the system and the remote is established, the remote's compatibility with various data compression algorithms may be polled, and the system may allocate appropriate data compression resources. These data compression resources may include voice compression algorithms and image compression algorithms. Those in this art will further understand that when the interconnecting link has particularly high speed and/or wide bandwidth capabilities, data compression resources may become unnecessary, and so are advantageously not allocated even though available.

Returning now to FIG. 2A, let it now be assumed in block 135 that the system has determined the characteristics of the terminal device and the interconnecting link, including speed and/or bandwidth capability. The next inquiry is to determine the media supported by the terminal device, consistent with speed/bandwidth capabilities. It will be understood that support of particular media is often more software-or operating system-related than hardware-related. Intelligence in the system, particularly in CPU 50 and IIRU 30 as described on FIG. 1, thus polls the remote terminal devices and determines whether the terminal device and link will support text only, or graphics, or graphics and sound (blocks 145 and 150). As an alternative to polling, this determination may also be made by presenting a menu to the user or by posing a series of questions to the user.

If the user's terminal device supports text only, then the system allocates resources so that bank balance information is communicated to the remote terminal in a non-graphical text format only (block 140).

If, on the other hand, it is determined that the remote terminal can support graphics, then the system allocates resources so that bank balance information is communicated in a graphical environment (block 155). If it is further determined that the remote terminal can also support sound, then the system allocates resources to enable bank balance to be communicated in a multimedia discussion, including MIDI and/or WAV sound information, if supported (block 160). Although not illustrated, those in this art will further understand that other resources, such as video resources, may also be allocated if it is determined that the remote terminal supports this communications particular format.

Returning to block 130, at which time a modem type was being established, and with further reference to FIG. 2B, let it now be assumed that a fax modem is detected at block 130. A first step is to authorize the caller, since a remote fax machine often has no live operator in attendance who can submit an authorization code independently. This caller authorization may be by ANI or other means (block 165). Unauthorized callers are disconnected (blocks 167 and 170).

Once a call is authorized, intelligence in the system (again, advantageously CPU 50 in combination with IIRU 30 on FIG. 1) polls the remote fax machine and the interconnecting link to establish a send fax/receive fax disposition (block 175). It will be understood that in the absence of a live attendant at the remote fax machine, it may not be immediately clear whether a fax is to be received or sent by the system. Accordingly, the system determines this from call parameters. For example, the caller's originating telephone number may match a pre-stored number on file that has already been designated as a "send fax" or "receive fax" number. Alternatively, the disposition may be determined from polling mode signals in handshaking protocols between the remote fax machine and the system. Alternatively again, the caller may have called in to a specific number or mailbox that is predefined as "send fax" or "receive fax".

Having determined whether to enable "send fax" or "receive fax" mode the system then allocates appropriate resources (blocks 180S and 180R) The faxes are transferred (blocks 185S and 185R) and the call is disconnected (blocks 190S and 190R).

It will be appreciated that the foregoing example of the present invention in service at a financial institution is but one of many applications for the invention, and that the detailed logic and information flow will likely vary from one application to the next. Nonetheless, those in this art will understand that the general "inquiry and deduction" principles embodied in the logic described above will apply universally to all applications.

Although the present invention and its advantages have been described in detail, it should be understood that various changes, substitutions and alterations can be made herein without departing from the spirit and scope of the invention as defined by the appended claims.

I claim:

1. A method for identifying the format of a communication incoming from a remote terminal to a central telecommunications system, said system disposed to exchange information with the remote terminal during the communication, said system further disposed to allocate resources responsive to said format identification, said allocated resources enabling said information to be exchanged in a format intelligible to the remote terminal, said method comprising the steps of:

receiving an incoming communication from said remote terminal:

determining an actual format of said incoming communication, wherein said actual format corresponds in part to a particular type of communications device at said remote terminal:

transmitting outgoing communications to said remote terminal, said outgoing communications comprising generic information stored in a database coupled to said central telecommunications system, said generic information modified for transmission in said actual format.

2. The method of claim 1 further comprising the step of:

(a) playing audible speech to the remote terminal, said speech being predetermined to elicit an expected response if the remote terminal is a telephone operated by a human user.

3. The method of claim 2, in which the actual format is DTMF.

4. The method of claim 2, in which the actual format is voice.

5. The method of claim 1, in which said actual format determining step comprises the steps of:

detecting modem handshake signals received from the remote terminal, and determining whether the source of said modem handshake signals is a fax modem or a data modem or a hearing impaired modem.

6. The method of claim 5, in which said modem is coupled to said system by an interconnecting link, and in which said actual format determining step further includes the substep of:

establishing the data transfer speed and bandwidth capabilities of said data modem in combination with said interconnecting link.

7. The method of claim 1, in which said actual format determining step comprises the steps of:

detecting modem handshake signals received from the remote terminal, and recognizing that the source of said modem handshake signals is a data modem, and in which said method further comprises the step of:

determining whether the remote terminal will support communications in one or more predetermined media.

8. The method of claim 7, in which said actual format determining step is accomplished by robotically polling the remote terminal.

9. The method of claim 7, in which said actual format determining step is accomplished by requesting a user of the remote terminal to identify media that are supported.

10. The method of claim 7, in which said one or more predetermined media are selected from the group consisting of:

(a) text;
(b) MIDI sound;
(c) WAV sound;
(d) graphics; and
(e) video.

11. The method of claim 1, further comprising the step of selectively using compression algorithms in exchanging said information.

12. The method of claim 11, in which said compression algorithms are not used when the data transmission rate at which information may be exchanged exceeds preselected levels.

13. The method of claim 1, in which said actual format determining step includes the substep of recognizing that the communication is in digital format, and in which said method further comprises the step of:

determining whether the remote terminal will support communications in one or more predetermined media.

14. The method of claim 13, in which said actual format determining step is accomplished by robotically polling the remote terminal.

15. The method of claim 13, in which said actual format determining step is accomplished by requesting a user of the remote terminal to identify media that are supported.

16. The method of claim 13, in which said one or more predetermined media are selected from the group consisting of:

(a) text;
(b) MIDI sound;
(c) WAV sound;
(d) graphics; and
(e) video.

17. The method of claim 1, in which said actual format determining step includes the substep of recognizing that the communication is in fax format and in which said method further comprises the steps of:

prevalidating the authority of the remote terminal to exchange information with said system; and establishing whether a fax is to be sent or received by said system.

18. The method of claim 17, in which the step of prevalidating includes the substeps of:

identifying the remote terminal; and matching said identity against prestored authorized remote terminal identities.

19. The method of claim 18, in which the substep of identifying includes reading the Automatic Number Identification (ANI) origin from which the remote terminal is communicating.

20. The method of claim 17, in which said establishing step is accomplished with reference to predetermined communication parameters.

21. The method of claim 20, in which said predetermined communication parameters include one or more parameters selected from the group consisting of:

(a) Automatic Number Identification (ANI) origin from which the remote terminal is communicating;
(b) Dialed Number Identification Service (DNIS) destination to which the remote terminal's communication is incoming; and
(c) Polling mode signals in handshaking protocols between the remote terminal and said system.

22. A telecommunications system to which one or more remote terminals are coupled via interconnecting links to enable communications therebetween, said communications characterized by a plurality of separate data transmission requirements among said remote terminals and said interconnecting links, the telecommunications system comprising:

means for determining data transmission requirements for said remote terminals, wherein said data transmission requirements correspond in part to a particular type of communications device at said remote terminals;

database means for storing generic information that is to be transmitted by said telecommunications system;

means for transmitting said generic information to said remote terminals, wherein said transmitting means modifies said generic information to comply with said data transmission requirements for said remote terminals.

23. The system of claim 22, in which said data transmission requirements include requirements that information be communicated in a specific format.

24. The system of claim 22, in which said data transmission requirements include requirements that information be communicated within a specific range of speeds.

25. The system of claim 22, in which the one or more remote terminals include at least one remote terminal selected from the group consisting of:

(a) a general purpose telephone;
(b) an enhanced capability telephone also having a visual display;
(c) a general purpose computer;
(d) a multimedia computer;
(e) a home entertainment center;
(f) a fax machine;
(g) a wireless telephone;
(h) a pager;
(i) a hearing impaired terminal; and
(j) a personal communications system (PCS).

26. The system of claim 22, in which the interconnecting links include at least one link selected from the group consisting of:

(a) a general purpose voice telephone line;
(b) an Integrated Services Data Network (ISDN) line;
(c) a T1 line;
(d) a fiber optic line; and
(e) a wireless connection.

27. The system of claim 22, in which at least one of said communications includes information communicated in a compressed format.

28. A computer program product having a computer readable medium on which computer readable logic is recorded for allocating centralized resources to communications directed to a telecommunications system by a remote terminal, the resources enabling information to be exchanged with the remote terminal in a format compatible with said communications, the system including a processor and a memory, the computer program product comprising:

means for prompting said remote terminal to provide an incoming communication in a first communication format, wherein said prompting means plays audible speech to the remote terminal, said speech predetermined to elicit an expected response if the remote terminal is a telephone operated by a human;

means for receiving said incoming communication;

means for determining an actual communication format of said incoming communication;

means for exchanging information with said remote terminal in said actual communication format, wherein said exchanged information comprises generic data stored in a database coupled to said telecommunications system.

29. A method for identifying the format of a communication incoming from a remote terminal to a central telecommunications system and for allocating resources responsive to said format identification, said allocated resources enabling said information to be exchanged in a format intelligible to the remote terminal, said method comprising the steps of:

determining whether the remote terminal is a telephone operated by a human user; and if the remote terminal is determined not to be a telephone operated by a human user:

(a) polling for modem handshake signals received from the remote terminal;

(b) if modem handshake signals are detected, determining whether the source of said modem handshake signals is a fax modem or a data modem or a hearing impaired modem;

(c) if modem handshake signals are not detected, determining whether the communication is in digital format;

(d) establishing the data transfer speed and the bandwidth capabilities afforded by said communication; and (e) if either (1) the source of said modem handshake signals is determined to be a data modem, or (2) the communication is determined to be in digital format, determining whether the remote terminal will support communications in one or more media, said one or more media selected from the group consisting of:

(i) text;
(ii) MIDI sound;
(iii) WAV sound;
(iv) graphics; and
(v) video; and allocating a resource capable of communicating with said remote unit in a format intelligible to the remote unit;

communicating generic information from a central resource to said remote unit, wherein said generic information is converted to said intelligible format by said allocated resource.

* * * * *